United States Patent

Model et al.

[11] 3,912,710
[45] Oct. 14, 1975

[54] ARYLAZO-IMINOISOINDOLINONE DYESTUFFS

[75] Inventors: Ernst Model, Basel; Jost von der Crone; Andre Pugin, both of Riehen, all of Switzerland

[73] Assignee: Ciba-Geigy Corporation, Ardsley, N.Y.

[22] Filed: Sept. 13, 1972

[21] Appl. No.: 288,620

[30] Foreign Application Priority Data
Sept. 27, 1971  Switzerland.................. 14053/71

[52] U.S. Cl. ............ 260/165; 106/288 Q; 260/152; 260/205; 260/206; 260/207; 260/207.1; 260/326 HL
[51] Int. Cl.² ........................................ C09B 43/00
[58] Field of Search............................. 260/165, 152

[56] References Cited
UNITED STATES PATENTS

| | | | |
|---|---|---|---|
| 2,973,358 | 2/1961 | Pugin.............................. | 260/165 X |
| 3,173,905 | 3/1965 | Sureau et al........................ | 260/162 |
| 3,360,508 | 12/1967 | Sureau et al........................ | 260/163 |
| 3,687,972 | 8/1972 | Padmanathan.................. | 260/165 X |

*Primary Examiner*—Floyd D. Higel
*Attorney, Agent, or Firm*—Vincent J. Cavalieri

[57] ABSTRACT

Iminoisoindolinone dyestuffs of the formula

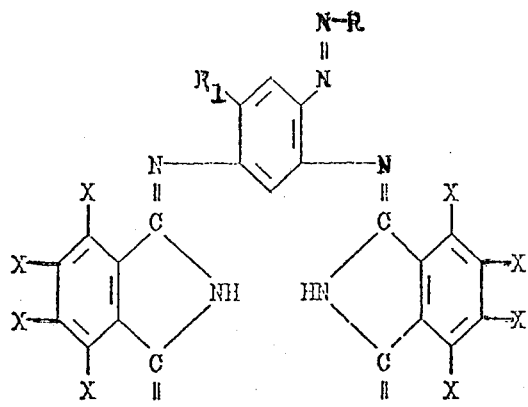

wherein R denotes an aromatic radical, $R_1$ denotes a H or chlorine atom, an alkyl, alkoxy, hydroxyalkoxy or alkoxyalkoxy group containing 1 to 4 carbon atoms, or a phenoxy, phenalkoxy, phenalkoxyalkoxy or phenoxyalkoxy group and the X denote halogen atoms, are provided. The dyestuffs are valuable pigments which may be used for pigmenting high molecular organic materials such as cellulose, ethers, polyamides or polyesters. The pigments possess high fastness properties, especially excellent fastness to light, migration and weathering.

9 Claims, No Drawings

ARYLAZO-IMINOISOINDOLINONE DYESTUFFS

It has been found that new valuable iminoisoindolinone dyestuffs of the formula

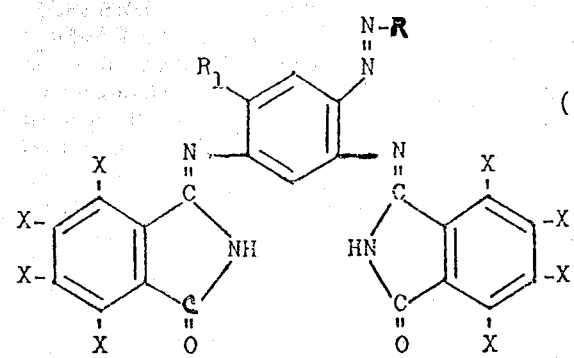

(I)

wherein R denotes an aromatic radical, $R_1$ denotes H or a chlorine atom, an alkyl, alkoxy, hydroxyalkoxy or alkoxyalkoxy group containing 1–4 carbon atoms or a phenoxy, phenalkoxy, phenalkoxyalkyl or phenoxyalkoxy group and the X denote halogen atoms, are obtained if an azo compound of the formula

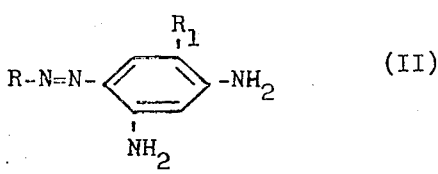

(II)

wherein R and $R_1$ have the indicated meaning is condensed in the molar ratio of 1:2 with a 4,5,6,7-tetrahalogenoisoindolinone-1 which in the 3-position contains easily replaceable substituents which, depending on their nature or number, require two bonds and are more mobile than the oxygen present in the 1-position.

In the dyestuffs according to the invention, R preferably corresponds to a benzene radical. Particular interest attaches to dyestuffs of the formula

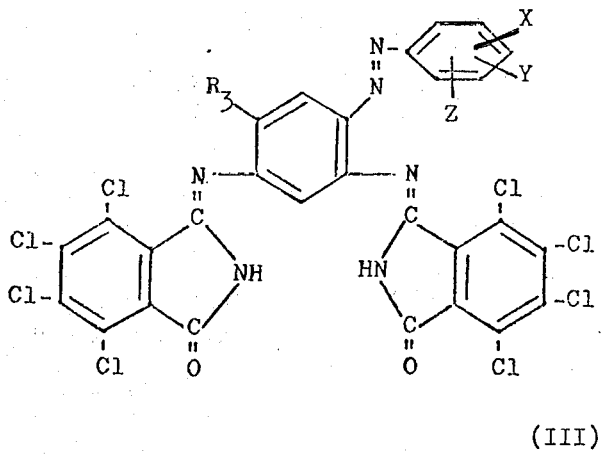

(III)

wherein $R_3$ denotes a H atom or a methoxy group, X denotes a hydrogen or halogen atom or an alkyl, alkoxy, trifluoromethyl, acylamino, carboxylic acid ester or carboxylic acid amide group, and Y and Z denote hydrogen or halogen atoms or alkyl or alkoxy groups containing 1 to 4 carbon atoms, and especially those of the formula (IV)

wherein $R_3$ denotes a H atom or a methoxy group and $Y_1$ and $Z_1$ denote hydrogen or halogen atoms or alkyl or alkoxy groups containing 1 to 4 carbon atoms, or those of the formula (V)

wherein $R_3$, $Y_1$ and $Z_1$ have the indicated meanings and $R_2$ denotes an alkyl group, containing 1 to 3 carbon atoms, or a phenyl radical optionally substituted by halogen atoms or alkyl or alkoxy groups containing 1 to 4 carbon atoms, or those of the formula (VI)

wherein $R_3$, $Y_1$ and $Z_1$ have the indicated meaming, $X_3$ and $Y_3$ denote hydrogen or halogen atoms or alkyl or alkoxy groups containing 1 to 4 carbon atoms, or trifluoromethyl groups, and $Z_3$ denotes a hydrogen or halogen atom or an alkyl or alkoxy group containing 1 to 4 carbon atoms.

The starting substances used are, for example, 4,5,6,7-tetrabromo-isoindolines but preferably 4,5,6,7-tetrachloro-isoindolines. As easily replaceable substituents in the 3-position they contain, for example, two halogen atoms, especially chlorine atoms, two secondary amino groups, for example those containing 1 to 4 carbon atoms, for example piperidino or morpholino groups, an imino or a thio group or especially 2 alkoxy groups, for example those containing 1 to 4 carbon atoms, especially methoxy groups. These starting substances are known.

The azo compounds used are preferably those of the formula

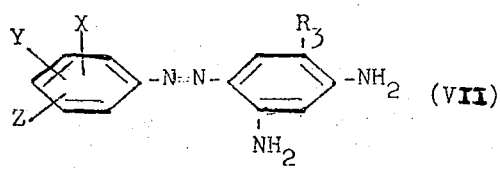

wherein $R_3$, X, Y and Z have the indicated meaning and especially those of the formula

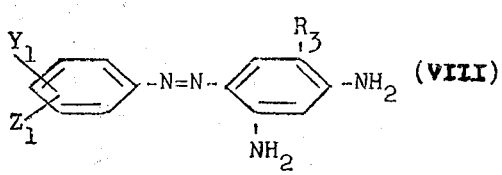

wherein $R_3$, $Y_1$ and $Z_1$ have the indicated meanings,

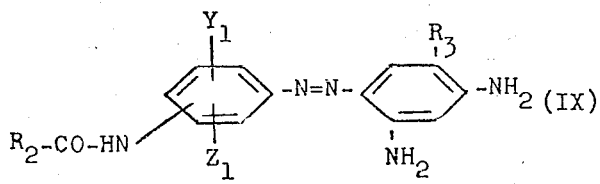

wherein $R_2$, $R_3$, $Y_1$ and $Z_1$ have the indicated meaning, or those of the formula

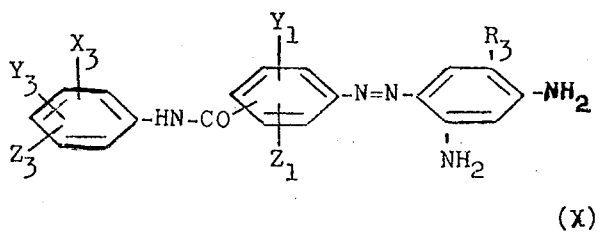

wherein $R_3$, $X_3$, $Y_1$, $Y_3$, $Z_1$ and $Z_3$ have the indicated meaning.

These azo compounds represent known compounds which are obtained by coupling a diazotised aromatic amine with m-phenylenediamine, 2,4-diaminochlorobenzene, 2,4-diaminoanisole or 2,4-diaminotoluene. The following amines may be mentioned as examples of diazo components: aniline, 2-, 3- or 4-chloroaniline, 3,4-dichloroaniline, 2,3-dichloroaniline, 2,4-dichloroaniline, 2,5-dichloroaniline, 2,6-dichloroaniline, 3,5-dichloroaniline, 2,4,5-trichloroaniline, 2,4,6-trichloroaniline, 2-, or 3- or 4-bromoaniline, 2,4-dibromoaniline, 2,5-dibromoaniline, 2-, 3- or 4-methylaniline, 3,5-dimethylaniline, 2,4-dimethylaniline, 2,5-dimethylaniline, 2-methyl-5-chloroaniline, 2-methyl-4-chloroaniline, 2-methyl-3-chloroaniline, 2-chloro-5-trifluoromethylaniline, 3-trifluoromethylaniline, 3,5-bis-trifluoromethylaniline, 2-chloro-5-trifluoromethylaniline, 2- and 4-methoxyaniline, 3-chloro-4-methoxyaniline, 2-methoxy-5-chloroaniline, 2,5-dimethoxy-4-chloroaniline, 2-methoxy-5-trifluoromethylaniline, 2-amino-4-trifluoromethyl-4'-chlorodiphenyl-ether, 2-amino-4-trifluoromethyldiphenyl-ether, 2-amino-4-chloro-diphenyl-ether, 2-amino-2',4-dichloro-diphenyl-ether, 2-amino-4,4'-dichloro-diphenyl-ether, 1-aminobenzene-2-carboxylic acid methyl ester, 1-aminobenzene-2-carboxylic acid ethyl ester, 1-aminobenzene-2-chloro-5-carboxylic acid methyl ester, 1-amino-2-methylbenzene-5-carboxylic acid methyl ester, 1-amino-2-chlorobenzene-5-carboxylic acid methylamide, 4-methyl-3-aminobenzoic acid amide, 4-chloro-3-aminobenzoic acid amide, 2,4-dichloro-5-aminobenzoic acid amide, 4-methoxy-3-aminobenzoic acid amide, 4-methyl-3-aminobenzoic acid 2'-chloro-5'-trifluoromethylanilinde, 4-chloro-3-aminobenzoic acid 2',5'-dichloroanilide, 4-chloro-3-aminobenzoic acid 2'-chloro-5'-carbomethoxyanilinde, 4-chloro-3-aminobenzoic acid 3'-chloroanilide, 2,4-dichloro-5-aminobenzoic acid 2',5'-dichloroanilide, 2,4-dichloro-5-aminobenzoic acid 3'-trifluoromethylanilide, 2,4-dichloro-5-aminobenzoic acid 3'-chloroanilide, 5-amino-4-methoxy-2-chlorobenzoic acid 3'-trifluoromethylanilide, 4-methoxy-3-aminobenzoic acid 3'-chloroanilide, 4-methoxy-3-aminobenzoic acid 2',5'-dichloroanilide, 4-carbomethoxy-3-aminobenzoic acid anilide, 4-methoxy-3-aminobenzoic acid 3'-trifluoromethylanilide, 4-carboethoxy-3-aminobenzoic acid 2',5'-dichloroanilide, 4-aminobenzoic acid 2',4'-dichloroanilide, 4-aminobenzoic acid 2'-chloro-5'-trifluoromethylanilide, 4-amino-3-methylbenzoic acid 3'-trifluoromethylanilide, 4-amino-3-methylbenzoic acid 4'-chloroanilide, 4-benzoylamino-aniline, 2,5-dichloro-4-benzoylaminoaniline, 2,5-dichloro-4-(4'-chlorobenzoylamino)-aniline, 2,5-dichloro-4-(2',4'-dichlorobenzoylamino)-aniline, 2,5-dichloro-4-(2',5'-dichlorobenzoylamino)-aniline, 2,5-dichloro-4-(4'-methylbenzoylamino)-aniline, 2,5-dichloro-4-(4'-phenylbenzoylamino)-aniline, 2,5-dimethyl-4-benzoylamino-aniline, 2,5-dimethyl-4-(4'-chlorobenzoylamino)-aniline, 2,5-dimethyl-4-(2',4'-dichlorobenzoylamino)-aniline, 2,5-dimethyl-4-(2',5'-dichlorobenzoylamino)-aniline, 2,5-dimethyl-4-(4'-methylbenzoylamino)-aniline, 2,5-dimethyl-4-(4'-methoxybenzoylbenzoyl-amino)-aniline, 2-chloro-5-methyl-4-benzoylamino-aniline, 2-chloro-5-methyl-4-(4'-chlorobenzoylamino)-aniline, 2-chloro-5-methyl-4-(2',5'-dichlorobenzoylamino)-aniline, 2-chloro-5-methyl-4-(4'-methylbenzoylamino)-aniline, 2-chloro-5-methyl-4-(4'-phenylbenzoylamino)-aniline, 2-methoxy-5-chloro-4-(benzoylamino)-aniline, 2-methoxy-5-chloro-4-(4'-chlorobenzoylamino)-aniline, 2-methoxy-5-chloro-4-(2',5'-dichlorobenzoylamino)-aniline, 2-methoxy-5-chloro-4-(4'-methoxylbenzoylamino)-aniline, 2-methoxy-5-chloro-4-(4'-phenylbenzoylamino)-aniline, 4-(4'-carbomethoxy)-benzoylamino-aniline, 3,5-dimethyl-4-acetylaminoaniline, 3,5-dimethyl-4-(4'-chlorobenzoylamino)-aniline, 3,5-dichloro-4-acetylaminoaniline and 3,5-dichloro-4-(4'-chlorobenzoylamino)-aniline.

The condensation in part already occurs in the cold, and if necessary with warming the intimately mixed components, particularly advantageously in the presence of organic solvents which are inert, that is to say which do not participate in the reaction.

If starting from 3-imino-, 3-thio- or 3,3-bis-tert.-amino-4,5,6,7-tetrachloroisoindolin-1-ones or from alkali salts of 3,3-dialkoxy-4,5,6,7-tetrachloroisoindolin-1-ones, organic solvents which are miscible with water are advantageously used, for example lower aliphatic alcohols, such as lower alkanols, for example methanol, isopropanol or butanol, lower cyclic ethers, such as dioxane or ethylene glycol monomethyl ether and lower aliphatic ketones, such as acetone. Condensation here already takes place at relatively low temperatures. Avantageously, the reaction is carried out in the presence of agents which bind bases; as examples of such, there may be mentioned lower fatty acids which then simultaneously act as solvents, especially acetic acid.

If using 3,3-dihalogeno-4,5,6,7-tetrachloro-isoindolin-1-ones, organic solvents which are free of hydroxyl groups, such as hydrocarbons, for example aromatic hydrocarbons, such as benzene, toluene, xylene, tetrahydronaphthalene or diphenyl or cycloaliphatic hydrocarbons, for example cyclohexane, and also halogenated hydrocarbons, such as aliphatic hydrocarbons, for example carbon tetrachloride or tetrachloroethylene, or aromatic hydrocarbons, such as chlorobenzene or dichlorobenzenes and trichlorobenzenes, and also aromatic nitrohydrocarbons, such as nitrobenzene, ethers, namely aliphatic ethers, such as dibutyl ether, aromatic ethers, such as diphenyl ether, or cyclic ethers, such as dioxane, and also ketones, such as acetone, or esters, especially esters of lower fatty acids with lower alkanols, such as ethyl acetate, in the presence of acid-binding agents, are preferred.

The new pigment precipitates from the reaction medium directly after it is formed. For certain purposes this can be used directly as the crude pigment; it can however also be improved yet further in its properties, especially as regards purity, form and covering power, according to methods which are in themselves known, for example by extraction with organic solvents or by grinding with grinding auxiliaries which can subsequently be removed again, for example salts.

The new dyestuffs are valuable pigments which in a finely divided form can be used for pigmenting high molecular organic material, for example cellulose ethers and cellulose esters, such as ethylcellulose, acetylcellulose or nitrocellulose, polyamides or polyurethanes or polyesters, natural resins or synthetic resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, thermoplastic or thermosetting acrylic resins, rubber, casein, silicone and silicone resins, individually or as mixtures. It is immaterial whether the high molecular compounds mentioned are in the form of plastic masses or melts or in the form of spinning solutions, lacquers, paints or printing inks. Depending on the end use, it proves advantageous to employ the new pigments as toners or in the form of preparations. The new pigments are distinguished by high fastness properties, especially by excellent fastness to light, migration and weathering.

EXAMPLE 1

A hot solution of 5.3 g of 2,4-diaminobenzene in 200 ml of o-dichlorobenzene is added, with good stirring, to a solution of 17 g of 3,3,4,5,6,7-hexachloroisoindolin-1-one in 100 ml of o-dichlorobenzene. A yellow precipitate immediately forms. The suspension is heated to 150° – 160°C and is kept at this temperature for 2 hours, whilst stirring. The insoluble dyestuff is filtered off at 120°C and washed with alcohol, acetone and water. After drying, 13 g of a yellow pigment having excellent fastness properties are obtained, which can be used without further after-treatment and in lacquers gives yellow colourations of excellent fastness to light and to weathering.

EXAMPLE 2

20 g of 3,4,5,6-tetrachloro-2-cyanobenzoic acid methyl ester are stirred with 68.5 ml of a 1 N sodium methylate solution in methanol to give a clear solution. The sodium salt of 3,3-dimethoxy-4,5,6,7-tetrachloroisoindolin-1-one is thereby produced. 7 g of 2,4-diamino-3',4'-dichloroazobenzene and 100 ml of o-dichlorobenzene are now stirred in. The reaction mixture is heated to 100°C whilst distilling off methanol and stirring well. After adding a further 100 ml of o-dichlorobenzene and 24 ml of glacial acetic acid, the temperature is raised to 140° – 150°C and maintained for 2 hours. The insoluble dyestuff is filtered off at 120°C and washed with alcohol, acetone and water. After drying, 19 g of a yellow pigment which can be used directly in this form for incorporation into lacquers are obtained. The lacquerings are distinguished by excellent fastness to light and to weathering.

EXAMPLE 3–4

If, in the preceding examples, the 3,4,5,6-tetrachloro-2-cyanobenzoic acid methyl ester is replaced by a corresponding amount of 3,4,5,6-tetrabromo-2-cyanobenzoic acid methyl ester, a yellow pigment with similarly good properties is obtained.

EXAMPLES 5–112

The table which follows lists further dyestuffs of the formula

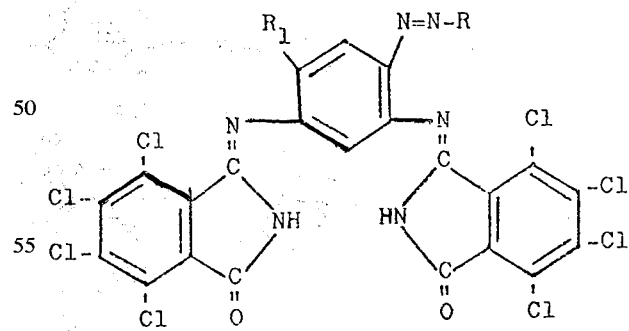

which are obtained if a diamine of the formula

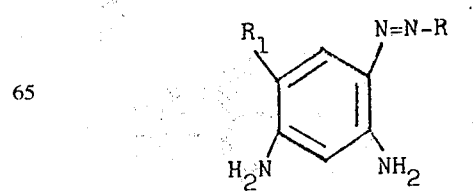

wherein R and $R_1$ have the meaning indicated in column II and III are condensed in a molar ratio of 1:2, in accordance with the instructions of Example 2, with 3,4,5,6-tetrachloro-2-cyanobenzoic acid methyl ester.

Column IV indicates the shade of a lacquer coloration obtained according to Example 115.

| Example No. | R | $R_1$ | Shade |
|---|---|---|---|
| 5 |  | H | Yellow |
| 6 |  | H | Yellow |
| 7 |  | H | Orange |
| 8 |  | H | Yellow |
| 9 | 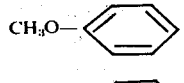 | H | Yellow-orange |
| 10 | 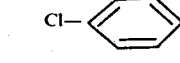 | H | Yellow |
| 11 | 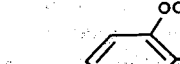 | H | Red-brown |
| 12 |  | H | Brown |
| 13 | 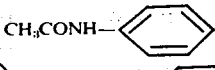 | H | Orange |
| 14 | 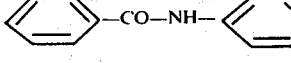 | H | Orange |
| 15 | 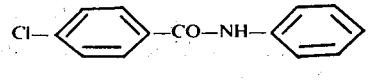 | H | Orange |
| 16 | 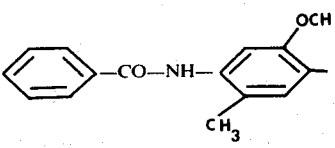 | H | Brown |
| 17 | 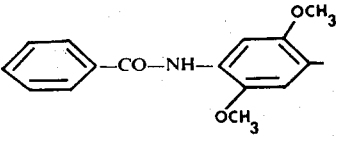 | H | Brown |
| 18 | 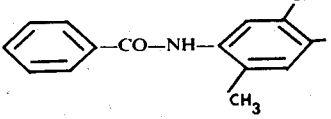 | H | Brown |
| 19 | 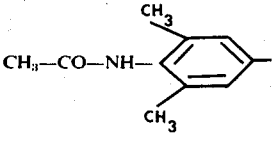 | H | Brown-yellow |

-continued
| Example No. | R | $R_1$ | Shade |
|---|---|---|---|
| 20 | 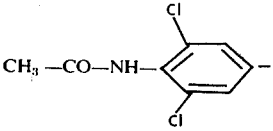 | H | Yellow-brown |
| 21 | 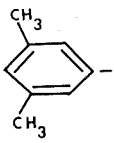 | H | Yellow |
| 22 | 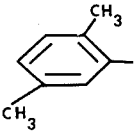 | H | Yellow |
| 23 | 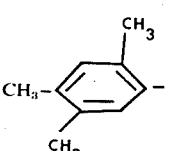 | H | Reddish-tinged yellow |
| 24 | 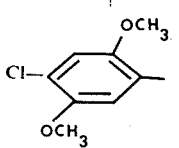 | H | Orange-red |
| 25 | 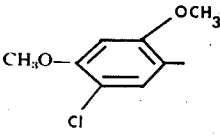 | H | Red-brown |
| 26 | 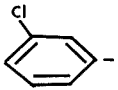 | H | Yellow |
| 27 | 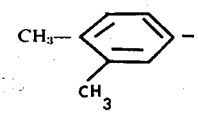 | H | Reddish-tinged yellow |
| 28 | 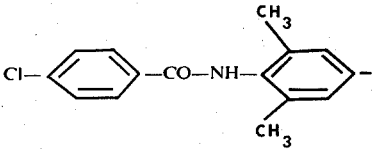 | H | Brown-yellow |
| 29 | 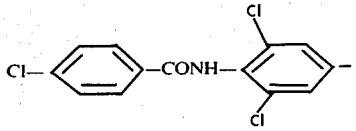 | H | Yellow-brown |
| 30 | 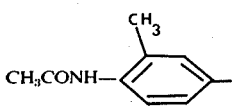 | H | Reddish-tinged yellow |

-continued

| Example No. | R | R₁ | Shade |
|---|---|---|---|
| 31 | 4-CH₃-2-(CH₃CONH)-phenyl | H | Orange |
| 32 | 2-Cl-4-(CH₃CONH)-phenyl (CH₃CONH—[2-Cl-phenyl]—) | H | Yellow-brown |
| 33 | 2-CH₃-4-(CH₃CONH)-phenyl | H | Reddish-tinged yellow |
| 34 | 4-OCH₃-3-(CH₃CONH)-phenyl | H | Orange |
| 35 | 4-Cl-3-[(2-Cl-phenyl)NHCO]-phenyl | H | Brown-yellow |
| 36 | 4-Cl-3-[(2,5-Cl₂-phenyl)NHCO]-phenyl | H | Yellow-brown |
| 37 | 4-Cl-3-[(2,6-Cl₂-phenyl)NHCO]-phenyl | H | Yellow |
| 38 | Cl—C₆H₄— | Cl | Yellow-brown |
| 39 | CH₃CONH—(2,6-(CH₃)₂-phenyl)— | Cl | Yellow |
| 40 | CH₃CONH—(2,6-Cl₂-phenyl)— | Cl | Brown-yellow |
| 41 | C₆H₅—CONH—C₆H₄— | Cl | Brown-yellow |

3,912,710
-continued
| Example No. | R | R₁ | Shade |
|---|---|---|---|
| 42 | 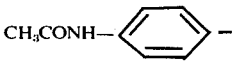 | Cl | Yellow |
| 43 | 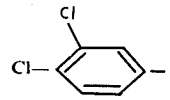 | Cl | Yellow |
| 44 | 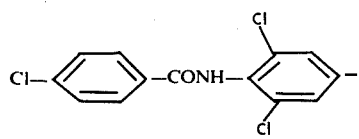 | Cl | Yellow-brown |
| 45 | 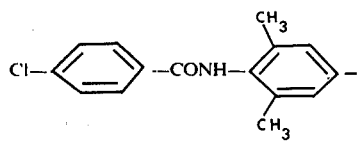 | Cl | Yellow-brown |
| 46 | 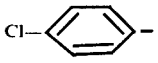 | CH₃ | Brown-yellow |
| 47 | 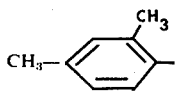 | CH₃ | Yellow-brown |
| 48 | 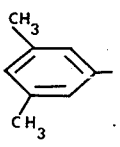 | CH₃ | Yellow |
| 49 | 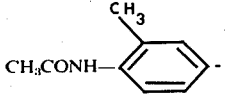 | CH₃ | Yellow |
| 50 | 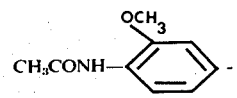 | CH₃ | Yellow |
| 51 | 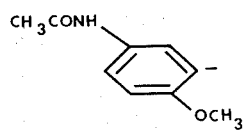 | CH₃ | Red-orange |
| 52 | 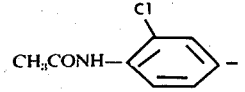 | CH₃ | Brown |
| 53 | 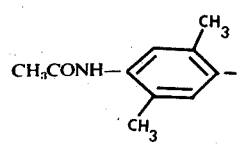 | CH₃ | Orange |

-continued

| Example No. | R | $R_1$ | Shade |
|---|---|---|---|
| 54 | 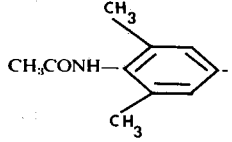 CH₃CONH—(2,6-dimethylphenyl)— | CH₃ | Yellow |
| 55 | 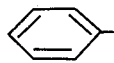 phenyl— | —OCH₃ | Orange |
| 56 | 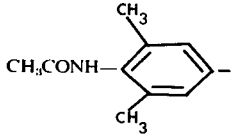 CH₃CONH—(2,6-dimethylphenyl)— | —OCH₃ | Orange |
| 57 | 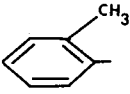 2-methylphenyl— | —OCH₃ | Orange |
| 58 | 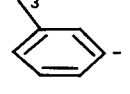 3-methylphenyl— | —OCH₃ | Orange |
| 59 | 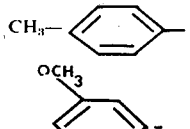 CH₃—(4-methylphenyl)— | —OCH₃ | Orange |
| 60 |  3-methoxyphenyl— | —OCH₃ | Brown-red |
| 61 | 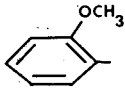 2-methoxyphenyl— | —OCH₃ | Orange |
| 62 | 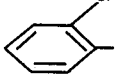 2-chlorophenyl— | —OCH₃ | Orange |
| 63 | 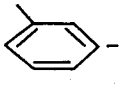 3-chlorophenyl— | —OCH₃ | Red-orange |
| 64 | 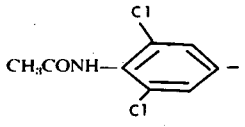 CH₃CONH—(2,6-dichlorophenyl)— | —OCH₃ | Brown |
| 65 | 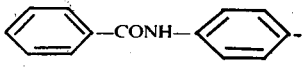 phenyl—CONH—phenyl— | —OCH₃ | Brown-red |
| 66 | 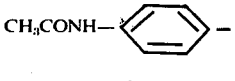 CH₃CONH—phenyl— | —OCH₃ | Brown |
| 67 | 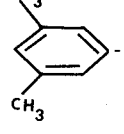 2,5-dimethylphenyl— | —OCH₃ | Orange |

-continued

| Example No. | R | R₁ | Shade |
|---|---|---|---|
| 68 | 2,5-dimethylphenyl | —OCH₃ | Orange |
| 69 | 2,3-dimethylphenyl | —OCH₃ | Orange |
| 70 | 2,4-dichlorophenyl | —OCH₃ | Brown |
| 71 | 4-biphenylyl | —OCH₃ | Red |
| 72 | 3,4-dichlorophenyl | —OCH₃ | Red-orange |
| 73 | 3,5-dichlorophenyl | —OCH₃ | Orange-red |
| 74 | 4-chlorophenyl—CONH—(2,6-dimethylphenyl)- | —OCH₃ | Orange |
| 75 | 4-(CH₃CONH)-3-methylphenyl- | —OCH₃ | Orange |
| 76 | 4-(CH₃CONH)-2-methoxyphenyl- | —OCH₃ | Red |
| 77 | 3,4,5-trichlorophenyl- | —OCH₃ | Brown |
| 78 | 2,4,5-trichlorophenyl- | —OCH₃ | Brown |

-continued
| Example No. | R | R₁ | Shade |
|---|---|---|---|
| 79 | 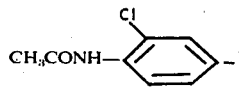 | —OCH₃ | Brown |
| 80 | 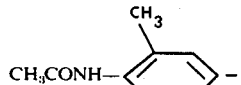 | —OCH₃ | Brown |
| 81 | 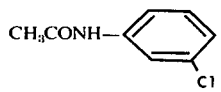 | —OCH₃ | Red-brown |
| 82 | 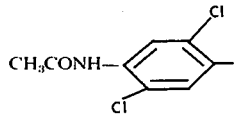 | —OCH₃ | Brown |
| 83 | 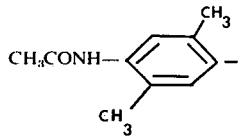 | —OCH₃ | Orange |
| 84 | 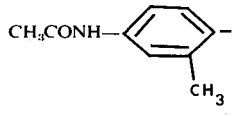 | —OCH₃ | Brown-red |
| 85 | 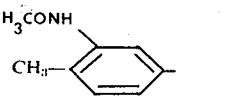 | —OCH₃ | Orange |
| 86 | 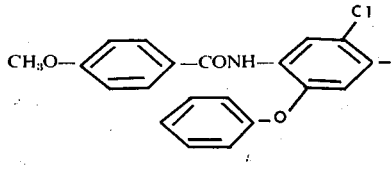 | —OCH₃ | Orange |
| 87 | 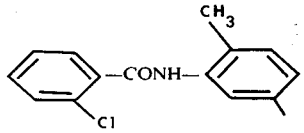 | —OCH₃ | Orange |
| 88 | 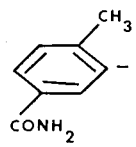 | —OCH₃ | Orange |
| 89 | 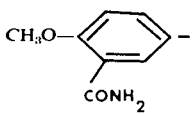 | —OCH₃ | Orange |

-continued
| Example No. | R | $R_1$ | Shade |
|---|---|---|---|
| 90 | 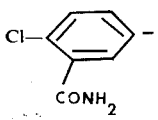 | —OCH₃ | Brown |
| 91 | 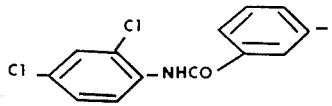 | —OCH₃ | Brown |
| 92 | 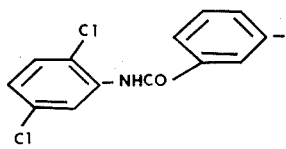 | —OCH₃ | Orange |
| 93 | 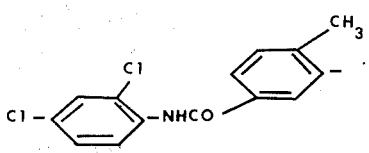 | —OCH₃ | Brown |
| 94 | 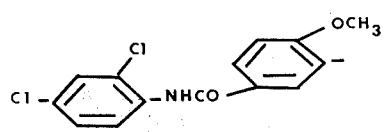 | —OCH₃ | Orange |
| 95 | 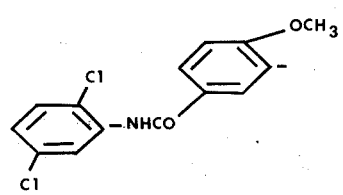 | —OCH₃ | Orange |
| 96 | 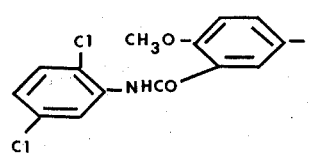 | —OCH₃ | Brown |
| 97 | 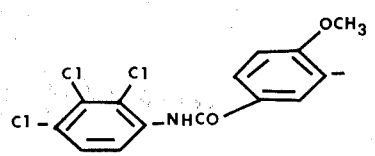 | —OCH₃ | Orange |
| 98 | 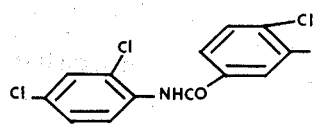 | —OCH₃ | Yellow-brown |

-continued
| Example No. | R | R₁ | Shade |
|---|---|---|---|
| 99 | 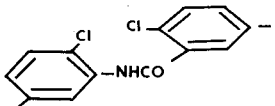 | —OCH₃ | Orange |
| 100 | 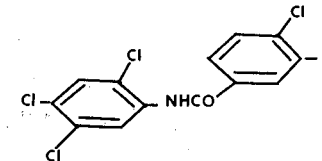 | —OCH₃ | Red-brown |
| 101 | 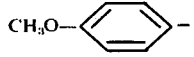 |  | Yellow |
| 102 | 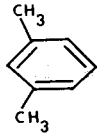 | —OCH₂CH₂O<br>             H₅C₂ | Orange |
| 103 |  | 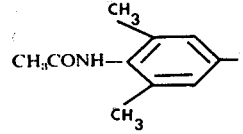 | Yellow |
| 104 | 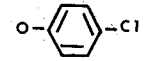 | —OC₂H₅ | Orange |
| 105 | 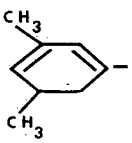 | OCH₂CH₂OH | Yellow |
| 106 | 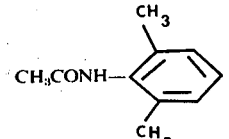 | 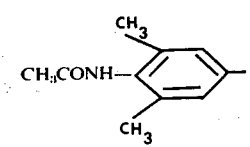 | Orange |
| 107 |  | OCH₂CH₂OCH₃ | Yellowish-tinged orange |

-continued

| Example No. | R | R₁ | Shade |
|---|---|---|---|
| 108 | CH₃CONH—(2,6-dimethylphenyl)— | OCH₂—C₆H₄—Cl | Brown |
| 109 | (2,5-dimethylphenyl)— | OCH₂CH₂OCH₃ | Orange |
| 110 | (2,6-dimethylphenyl)— | OCH₂—C₆H₄—Cl | Orange |
| 111 | (2,6-dimethylphenyl)— | OCH₂CH₂O—C₆H₄—Cl | Orange |
| 112 | (2,6-dimethylphenyl)— | OCH₂CH₂OCH₂—C₆H₄—Cl | Orange |

EXAMPLE 113

2 g of the pigment manufactured according to Example 2, 36 g of hydrated alumina, 60 g of linseed oil varnish of medium viscosity and 0.2 g of cobalt linoleate are mixed, and ground, on a triple-roll mill. The yellow prints produced with this colour paste are distinguished by excellent fastness to light.

EXAMPLE 114

0.6 g of the pigment manufactured according to Example 2 and listed under 67 in the table, 67 g of polyvinyl chloride, 33 g of dioctyl phthalate, 2 g of dibutyl tin dilaurate and 2 g of titanium dioxide are mixed and milled for 15 minutes on a triple-roll mill. The colour of the orange polyvinyl chloride films produced therewith is fast to migration, heat and light.

EXAMPLE 115

10 g of titanium oxide and 2 g of the pigment manufactured according to Example 2 and listed in the table under 58 are ground with 88 g of a mixture of 26.4 g of coconut alkyd resin, 24.0 g of melamine-formaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and subsequently stoved for 30 minutes at 120°C, an orange lacquering which is distinguished by very good fastness to overlacquering, light and weathering is obtained.

We claim:
1. An iminoisoindolinone dyestuff of the formula

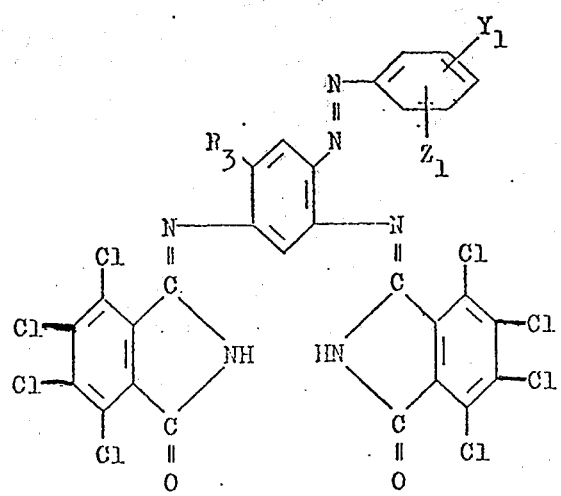

wherein $R_3$ is H or methoxy and $Y_1$ and $Z_1$ denote hydrogen, chlorine, alkyl containing 1 to 4 carbon atoms for alkoxy containing 1 to 4 carbon atoms.

2. An iminoisoindolinone dyestuff of the formula

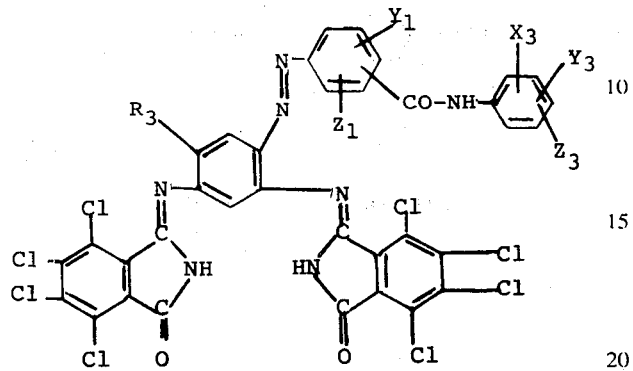

wherein $R_3$ denotes hydrogen or methoxy, $Y_1$ and $Z_1$ denote hydrogen, chloro, alkyl containing 1 to 4 carbon atoms or alkoxy containing 1 to 4 carbon atoms $X_3$ and $Y_3$ denote hydrogen, chloro, alkyl containing 1 to 4 carbon atoms alkoxy containing 1 to 4 carbon atoms, or trifluoromethyl, and $Z_3$ denotes hydrogen, chloro, alkyl containing 1 to 4 carbon atoms or alkoxy containing 1 to 4 carbon atoms.

3. An iminoisoindolinone dyestuff of the formula:

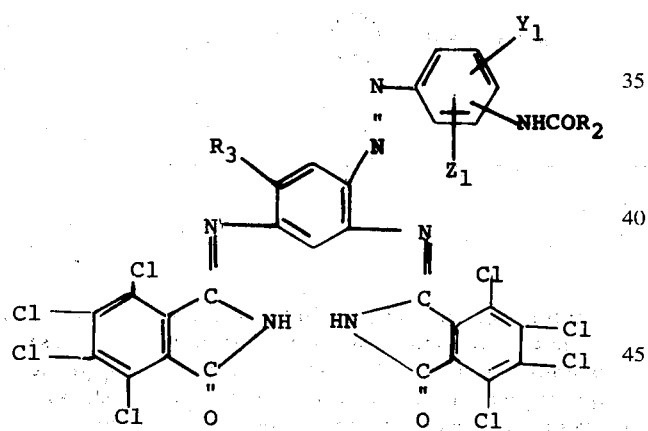

wherein $R_3$, $Y_1$ and $Z_1$ have the meaning indicated in claim 4 and $R_2$ denotes alkyl containing 1 to 3 carbon atoms, phenyl, chloro substituted phenyl, or alkoxy containing 1 to 4 carbon atoms.

4. The compound according to claim 1 of the formula

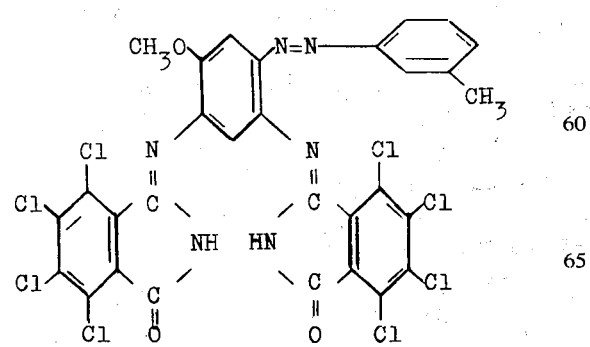

5. The compound according to claim 1 of the formula

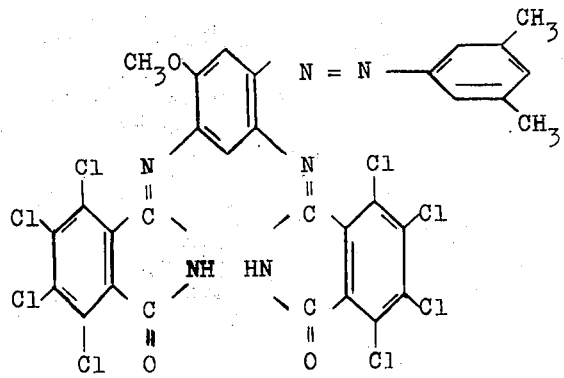

6. The compound according to claim 1 of the formula

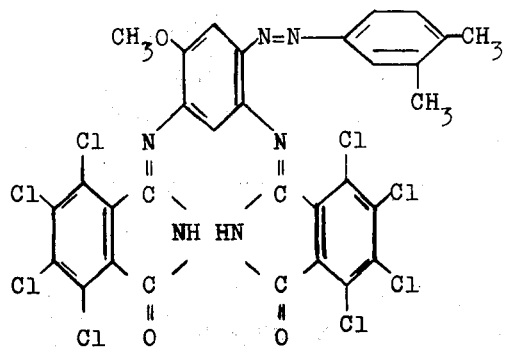

7. The compound according to claim 1 of the formula

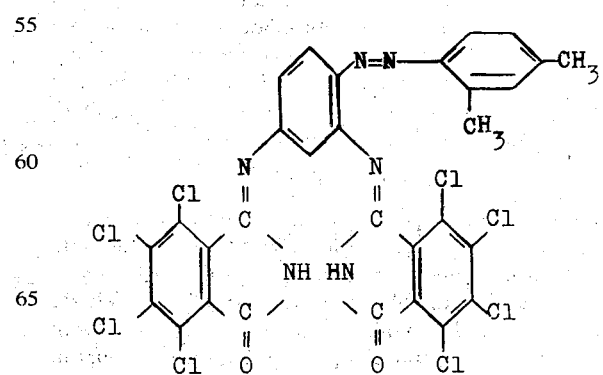

8. The compound accordng to claim 1 of the formula
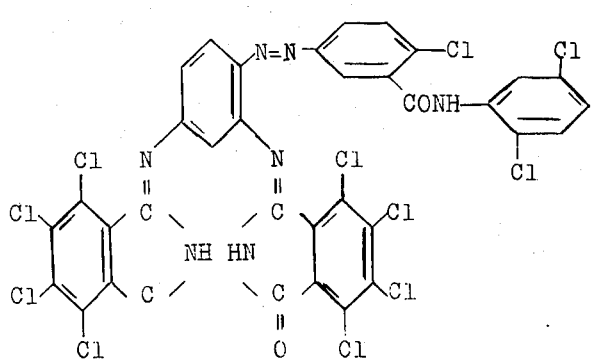
9. The compound according to claim 1 of the formula
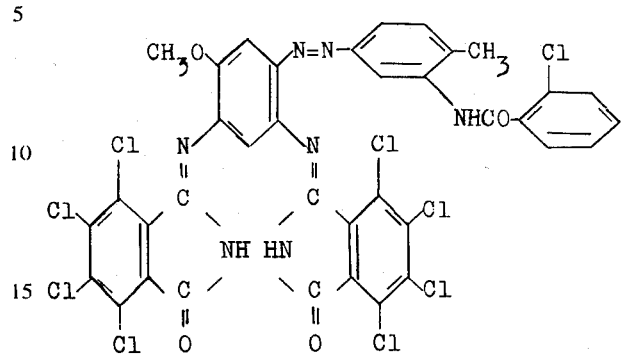
* * * * *